United States Patent
Mock

[11] 3,730,579
[45] May 1, 1973

[54] SPATULA

[76] Inventor: Norman M. Mock, 1934 James Downey Road, Independence, Mo. 64057

[22] Filed: July 8, 1971

[21] Appl. No.: 160,839

[52] U.S. Cl. ...................................................294/8
[51] Int. Cl. ..............................................A47j 43/28
[58] Field of Search....................294/1, 7, 8, 53.5; 15/235.4, 235.7, 235.8, 236; 30/172, 173, 186, 321, 342; 81/91 R, 91 A, 91 B; 99/242, 394

[56] References Cited

UNITED STATES PATENTS

| 952,746 | 3/1910 | Lane | 30/172 |
| 2,601,360 | 6/1952 | Blackshear | 294/8 |
| 3,566,424 | 3/1971 | Burbig | 7/1 |

*Primary Examiner*—Evon C. Blunk
*Assistant Examiner*—Johnny D. Cherry
*Attorney*—John A. Hamilton

[57] ABSTRACT

A spatula including a normally planar blade with a handle affixed to one end thereof, said blade being divided transversely into a plurality of sections, each section being pivoted to each contiguous section for upward movement normal to the plane of the blade, but restrained against downward pivotal movement.

7 Claims, 8 Drawing Figures

PATENTED MAY 1 1973 3,730,579
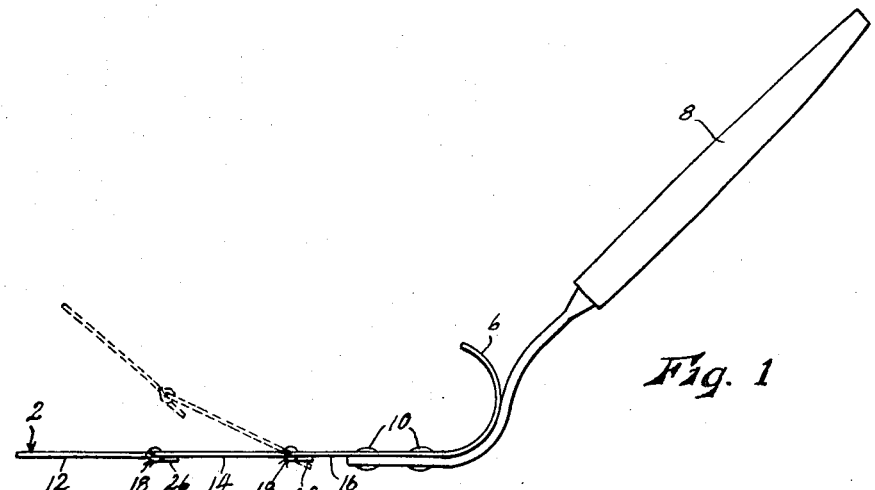
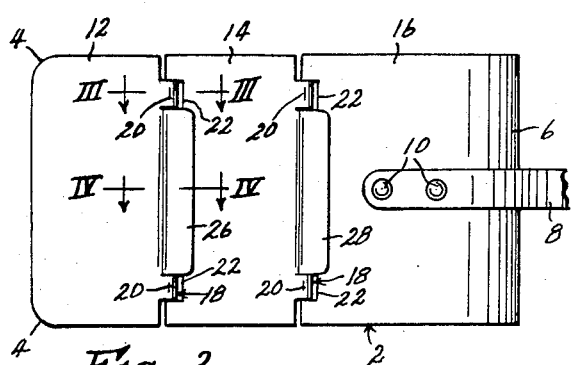
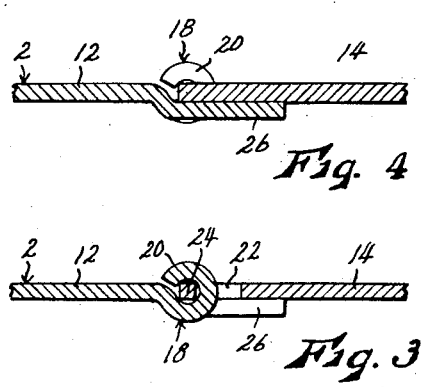
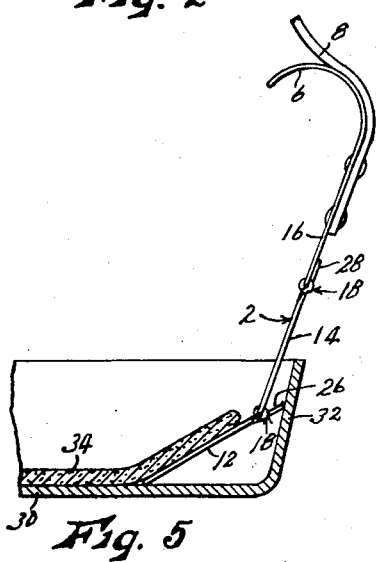
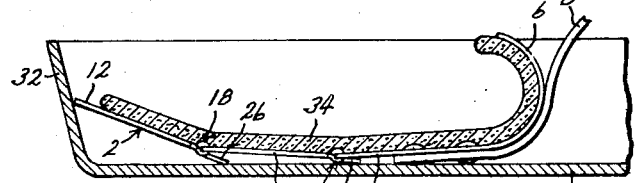
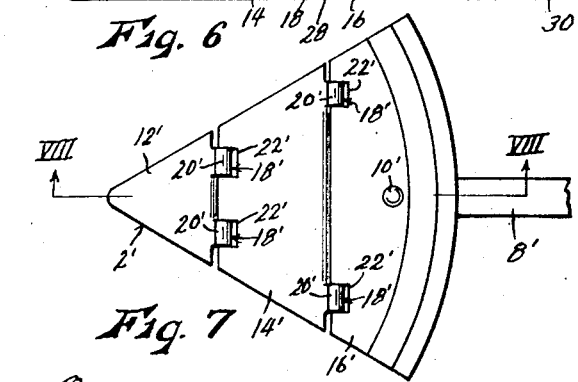
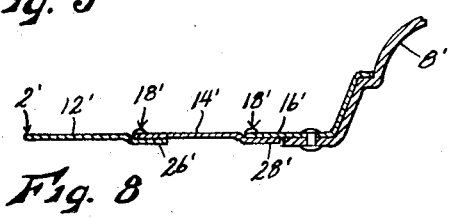
INVENTOR.
Norman M. Mock
BY John A. Hamilton
Attorney.

SPATULA

This invention relates to new and useful improvements in spatulas, and has particular reference to a spatula especially adapted for use in handling food, for example food cooking in a frying pan or other cooking utensil.

The object of the present invention is the provision of a spatula having special features whereby it may be used to turn, flip, fold, roll or otherwise manipulate food cooking in a pan with greater ease and facility than has heretofore been possible. Generally, this object is accomplished by the provision of a spatula the blade of which is divided transversely to its longitudinal extent into a series of edge-to-edge sections, said sections being hingedly joined at their contiguous edges for relatively upward pivotal movement only. While this spatula may be used as any ordinary spatula, it will be seen that the hinged blade provides various advantages, such as being able to insert the blade more easily under food closely adjacent or against the side wall of a pan, in a more nearly horizontal position, so as to avoid breaking or cutting the food layer when such is not desired, providing that the leading edge of the blade is more likely to slide smoothly between the food and the pan bottom rather than lifting therefrom and leaving some of the food in the pan, and a smoother, easier removal of the food when the leading edge thereof reaches the opposite side of the pan. By simple additions and modifications, it can be adapted for use in specialized functions, such as for starting the rolling of a pancake in the making of crepes suzettes, and as a pie server for removing pie segments from a pie tin.

Other objects are simplicity and economy of construction, efficiency and dependability of operation, and adaptability for use in a wide variety of applications.

With these objects in view, as well as other objects which will appear in the course of the specification, reference will be had to the accompanying drawing, wherein:

FIG. 1 is a side elevational view of a spatula embodying the present invention, shown in its normal position in solid lines, and showing other positions of the hinged blade sections in dotted lines, FIG. 2 is a fragmentary inverted plan view of the spatula as shown in FIG. 1, FIG. 3 is an enlarged, fragmentary sectional view taken on line III—III of FIG. 2, FIG. 4 is an enlarged, fragmentary sectional view taken on line IV—IV of FIG. 2, FIG. 5 is a fragmentary side elevational view of the spatula, shown in one position of use relative to a pan, FIG. 6 is a view similar to FIG. 5 showing the spatula in another position of use, FIG. 7 is a fragmentary top plan view of a slightly modified form of the spatula, and FIG. 8 is a fragmentary sectional view taken on line VIII—VIII of FIG. 7.

Like reference numerals apply to similar parts throughout the several views, and referring first to the form of the spatula shown in FIGS. 1–6, the numeral 2 applies generally to the blade of said spatula. Said blade is generally rectangular and planar, being rounded at its forward corners as indicated at 4 and having its rearward edge portion curved upwardly and then forwardly as indicated at 6 to form a cylindrical roll. A rearwardly and upwardly extending handle 8 is secured to the rearward end of said blade in any suitable manner, such as by rivets 10.

Intermediate its forward and rearward ends, blade 2 is divided transversely into a plurality (three as shown) of edge-to-edge sections 12, 14, and 16, section 12 being the forward section having rounded corners 4, section 16 being the rearward section including roll 6 and to which handle 8 is affixed, and section 14 being disposed between sections 12 and 16. Each section is joined to the next rearward section by a hinge connection 18 for pivotal movement relative thereto about an axis parallel to and generally coinciding with the contiguous edges thereof. Conveniently, said hinge connection may be accomplished by providing each of sections 12 and 14 with a plurality of rearwardly extending tabs 20 spaced apart transversely of the blade. Said tabs are inserted through corresponding holes 22 formed in the next rearward blade section adjacent the forward edge thereof, and bent to generally cylindrical form loosely encircling the portion 24 of the next rearward blade section between hole 22 and the forward edge thereof. Tabs 20 thus form the barrel of the hinge connection, and blade portions 24 the hinge pins. The hinge connection is sufficiently loose that the blade sections pivot freely relative to each other. Blade section 12 is provided at its rearward edge with a rearwardly projecting tab 26 which extends beneath the forward edge portion of section 14, and which abuts the lower surface of section 14 when sections 12 and 14 are disposed in coplanar relation. Similarly, blade section 14 is provided at its rearward edge with a rearwardly projecting tab 28 which cooperates in like manner with rear blade section 16. Thus, when the spatula is disposed in any position with the top surface of blade 2 uppermost, as in FIG. 1, all of the sections 12, 14, and 16 thereof will be disposed in coplanar relation, though section 14 can pivot upwardly relative to section 16, and section 12 can pivot upwardly relative to section 14, as shown in dotted lines in FIG. 1.

In use, it will be seen that since the blade assumes a generally planar form whenever held in any position with the top surface of the blade uppermost, as shown in solid lines in FIG. 1, the spatula may be used in the manner of an ordinary unhinged spatula to support food or the like on the top blade surface. Also, if the blade is inverted and the forward edge of forward blade section 12 is pressed against the bottom of a pan 30 or the like, the blade sections will be moved to their coplanar relation, and secured therein by tabs 26, so that the spatula may be used, when desired, to scrape the pan bottom with as great a force as may be desired. However, the hinge connections 18 provide certain types of operation not heretofore obtained with the ordinary spatulas. For example, it will be seen in FIG. 5 that the forward end of the blade may be introduced downwardly along the inside of a side wall 32 of pan 30, and will enter under the food 34 in the pan with a "curling" or "rolling" action as each hinge connection 18 first flexes to permit the blade section ahead of it to enter beneath the food, then straightens as the blade section behind it enters beneath the food. At the same time, the blade sections are of course in themselves rigid, so that as long as the pan itself supports the flexing hinge connections, the spatula may be pushed and advanced with any desired force. This curling action is somewhat similar to the action which would occur if a normally rigid spatula blade should suddenly become pliable or flexible along the line thereof which at any moment was curving under the food, but remained rigid at all other points. A more nearly complete and "flexible" curling action could of course be obtained by dividing the blade into a still greater number of sections, although in a spatula of a size to be used with ordinary frying pans or skillets, three sections have been found entirely satisfactory. The advantages of the curling action, so far as the food is concerned, are first that it permits the insertion of the spatula beneath food layer 30 with less danger or likelihood of cutting or disarranging the edges of the food layer, and second that in entering beneath the food layer in a more nearly horizontal position, there is less likelihood that said food layer will be folded or broken. The latter advantage is particularly apparent when handling food in deep pans. These considerations are important in connection with certain types of foods, such as omelets.

As the spatula is moved across the pan from the FIG. 5 position, it will be seen that as long as some flexure of hinge 18 between blade sections 12 and 14 is maintained, the forward edge of section 12 tends to rest on the pan bottom by gravity, so that there is little danger the spatula will be accidentally elevated above the pan bottom by careless handling. Such accidental lifting of the spatula could also cut and disarrange the food layer, and leave food in the pan to burn. When the forward edge of blade section 12 reaches the opposite side wall of pan 30, as shown in FIG. 6, it slides upwardly along said side wall, as permitted by flexure of forward hinge 18, freeing the food from said side wall in a continuous, uninterrupted motion of the spatula. With rigid spatula, the motion thereof must be stopped when it reaches the opposite side of the pan and before it is lifted, and during the pause it is often retracted slightly so as to leave food on the side wall when it is then lifted.

Tabs 26, besides preventing downward pivotal movement of each blade section relative to adjacent sections, as already described, also have other functions. For example, referring to FIG. 5, it will be seen that as each blade section enters beneath food layer 34 and lies substantially flat on the pan bottom, its tab 26 moves its hinge connection 18 sufficiently far away from the pan side wall to insure that downward force on the next rearward blade section will move the relatively forward section on across the pan, even if the pan side wall is vertical. Also, referring to FIG. 6, it will be seen that when forward blade section 12 reaches the opposite side of the pan and is pivoted upwardly on forward hinge 18, as already described, its tab 26 acts against the pan bottom to elevate the hinge itself, and also the leading edge of the next blade section 14. This insures the upward curling action of the spatula blade at the exit side of the pan. To provide these functions, it is necessary that tabs 26 of the blade sections, with respect to hinge connections 18, be carried by the blade section disposed relatively forwardly of the hinge, and extend beneath the blade section disposed relatively rearwardly of the hinge.

While it is common practice to provide a raised wall or lip along the rearward edges of spatula blades, if for no other reason than to prevent food moving over said blades from spilling over their rearward edges, the upward and forward curvature of roll 6 in the present case has the additional function of turning the food layer onto itself. This function may be utilized, for example, when it is desired to stir or mix food by use of the spatula. It may also be utilized, as suggested in FIG. 6, when food layer 34 constitutes a thin pancake intended for use in crepes suzettes, to start the rolling of the pancake.

FIGS. 7 and 8 show a modification of the spatula intended primarily for use as a pie server for removing segments of pie from a pie tin. Its structure and operation are generally identical to that of the spatula of FIGS. 1–6, corresponding parts being indicated by corresponding primed numerals, except that blade 2' is segmentally shaped, as shown, rather than rectangular, and except that its rearward edge is arcuately curved about the apex of the segment as a center rather than straight, and shaped in cross-sectional contour to conform to the contour of an ordinary pie tin, as best shown in FIG. 8. The difficulties of removing segments of pie from a pie tin neatly and without damage thereto are of course well known, and the present device performs this task very efficiently.

While I have shown and described a specific embodiment of my invention, it will be readily apparent that many minor changes of structure and operation could be made without departing from the spirit of the invention.

What I claim as new and desire to protect by Letters Patent is:

1. A spatula comprising:
    a. an elongated, generally planar blade having forward and rearward ends and upper and lower surfaces, said blade being divided transversely of its longitudinal extent into a plurality of separate sections disposed contiguously in edge-to-edge relation,
    b. hinge connections joining each adjacent pair of said blade sections for relative pivotal movement about an axis generally coinciding with their contiguous edges,
    c. means operable to prevent downward pivotal movement of each of said blade sections relative to the adjacent blade sections, and
    d. a handle secured to and projecting upwardly from the rearward end of said blade.

2. A spatula as recited in claim 1 wherein said means preventing relatively downward pivotal movement of adjacent blade sections comprises a rearwardly projecting extension tab provided on each relatively forward blade section, with respect to each hinge connection, said tab projecting beneath the relatively rearward blade section, with respect to said hinge connection, whereby to permit upward pivotal movement of said relatively forward blade section with respect to said relatively rearward blade section but to prevent relatively downward pivotal movement.

3. A spatula as recited in claim 1 wherein said hinge connection comprises laterally spaced tab extensions on one of the blade sections at the edge thereof contiguous with another blade section, each of said extensions projecting through a hole formed therefor in said other blade section and being formed cylindrically about the portion of said other blade section between said hole and the edge thereof contiguous with said one blade section.

4. A spatula as recited in claim 1 wherein the rearward edge portion of the rearmost blade section is turned upwardly.

5. A spatula as recited in claim 1 wherein the rearward edge portion of the rearmost blade section is curved upwardly and then forwardly in an arcuate configuration.

6. A spatula as recited in claim 1 wherein said blade is generally segmental in shape, the apex of said segmental configuration constituting the forward end of said blade.

7. A spatula as recited in claim 6 wherein the rearward edge portion of the rearmost blade section is inclined upwardly and rearwardly.

* * * * *